G. R. EVANS.
LAWN TRIMMER.
APPLICATION FILED OCT. 2, 1916.
1,232,255.
Patented July 3, 1917.
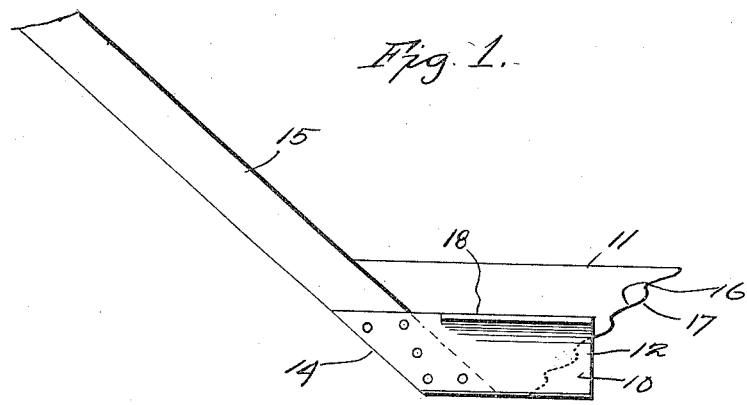
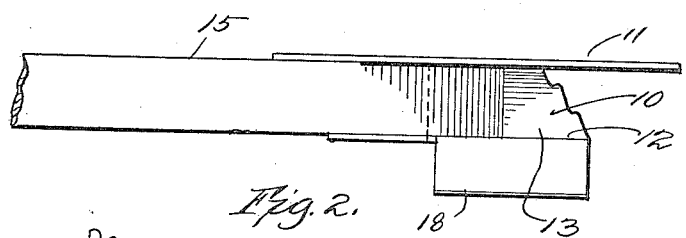
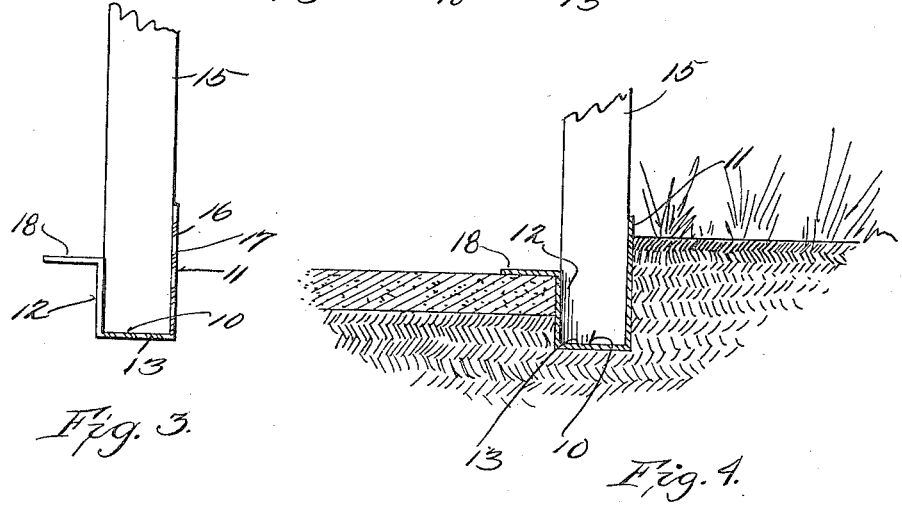
Witnesses
Inventor
G. R. Evans
By
Attorneys

UNITED STATES PATENT OFFICE.

GEORGE R. EVANS, OF FRESNO, CALIFORNIA.

LAWN-TRIMMER.

1,232,255.     Specification of Letters Patent.     Patented July 3, 1917.

Application filed October 2, 1916. Serial No. 123,390.

*To all whom it may concern:*

Be it known that I, GEORGE R. EVANS, a citizen of the United States, residing at Fresno, in the county of Fresno, State of California, have invented certain new and useful Improvements in Lawn-Trimmers; and I do hereby declare the following to be a full, clear, and exact description of the invention, such as will enable others skilled in the art to which it appertains to make and use the same.

This invention relates to improvements in lawn trimmers, and particularly to devices for trimming the edges of lawns next to the walks.

One object of the present invention is to provide a device of this character which is simple and cheap in its construction, and which is effective and durable in its operation.

Another object of the present invention is to provide a device of this character which will dig a small channel next to the edge of the walk, thereby removing the undesirable grass together with its roots.

Another object is to provide a device of this character which will be guided by the edge of the walk, both as to the width of the cut and depth thereof, and which will deposit the grass and soil, so dug up, onto the walk.

Other objects and advantages will be apparent from the following description when taken in connection with the accompanying drawing.

In the drawing:

Figure 1 is a side elevation of a lawn trimmer made in accordance with my invention.

Fig. 2 is a top plan view of the device.

Fig. 3 is a front elevation of the device.

Fig. 4 is a sectional detail view showing the device in use, the lawn, the walk, and the device being shown in section.

Referring particularly to the accompanying drawing 10 represents a channel member formed from metal, and including the vertical parallel side walls 11 and 12 and the bottom wall 13. The rear ends of the side walls are undercut, obliquely, as shown at 14. Between these rear ends of the side walls is disposed the lower end of a rod 15, which forms the handle by means of which the device is pushed. The forward end of the wall 11 is obliquely undercut, as shown at 16, and this undercut edge extends inwardly beyond the forward edge of the wall 12. Teeth or serrations are formed on the undercut edge 16, as shown. The forward edge of the bottom wall 13 extends obliquely inward to meet the lower end of the edge 16, and is provided with serrations 17. Extending horizontally from the upper edge of the wall 12 is a guiding flange 18 which is adapted to rest on the upper face of the walk, and near the edge thereof, while the channel portion is moved along the edge of the lawn.

It will thus be seen that as the device is pushed along between the walk and lawn, the channel of the device will dig out a channel from the edge of the lawn, thus removing the undesirable grass together with the roots thereof. The serrated edges of the walls 11 and 13 effectively and evenly trim the edge of the lawn, thereby removing a sufficient quantity of the soil adjacent the edge of the walk to prevent the grass growing there and overrunning the edge of the walk. The flange 18 regulates the depth to which the device enters the ground, by its engagement on the face of the walk adjacent the edge thereof.

Particular attention is called to the fact that the forward edges of the walls 11 and 13 incline downwardly and rearwardly to form a V-shaped wedge opening, and that the said edges are sharpened and formed with serrations. Thus, when the device is pushed along the edge of the lawn, a shearing cut is produced against the grass and soil both at the bottom of the channel and at the side next to the lawn.

What is claimed is:

A lawn edge trimmer comprising a channel member including vertical parallel sides and a horizontal connecting bottom, one of the side walls being of greater height than the other, the forward edge of the higher wall extending beyond the other wall and being serrated and inclined downwardly and rearwardly to a point rearwardly of said other wall, the forward edge of the bottom wall inclining rearwardly and meeting the first inclined edge to form an acute angle therebetween, said edge of the bottom wall being serrated, and a handle secured to the channel member remote from the serrated edges.

In testimony whereof, I affix my signature, in the presence of two witnesses.

GEORGE R. EVANS.

Witnesses:
J. N. MARSH,
HERBERT LEVY.

Copies of this patent may be obtained for five cents each, by addressing the "Commissioner of Patents, Washington, D. C."